June 30, 1942.　　A. O. WILLIAMS　　2,288,059
BRAKE SHOE MOUNTING
Filed May 29, 1940　　2 Sheets-Sheet 1

INVENTOR.
ALFRED O. WILLIAMS
BY Walter E. Schirmer
ATTORNEY.

June 30, 1942.                A. O. WILLIAMS                2,288,059
                           BRAKE SHOE MOUNTING
               Filed May 29, 1940              2 Sheets-Sheet 2
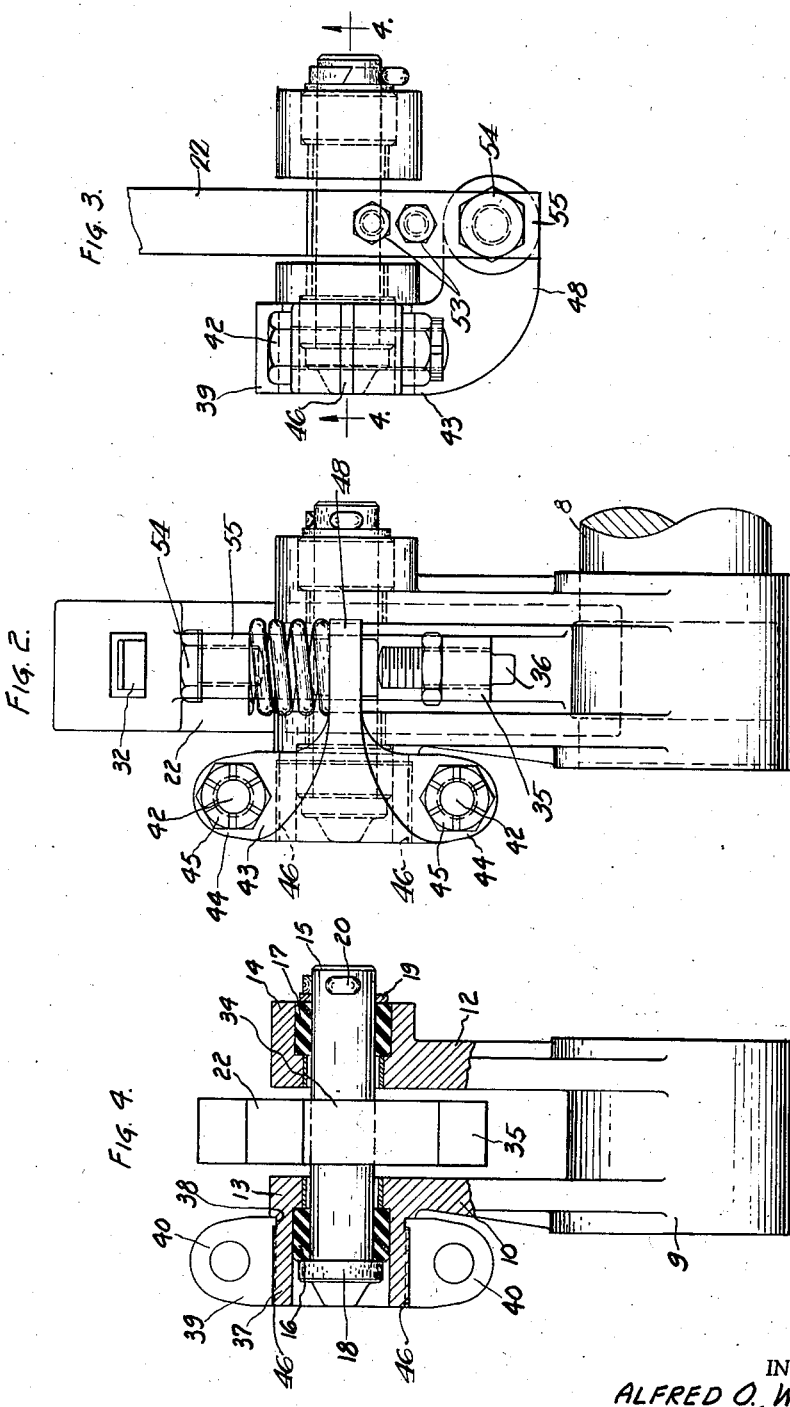
INVENTOR.
ALFRED O. WILLIAMS
BY Walter E. Schirmer
ATTORNEY.

Patented June 30, 1942

2,288,059

UNITED STATES PATENT OFFICE 2,288,059

BRAKE SHOE MOUNTING

Alfred O. Williams, Battle Creek, Mich., assignor to Clark Equipment Company, Buchanan, Mich., a corporation of Michigan Application May 29, 1940, Serial No. 337,793

10 Claims. (Cl. 188—212)

This invention relates to a brakeshoe mounting, and is more particularly concerned with a mounting for a brakeshoe of the clasp type adapted to engage the tread portion of a rail car wheel or the like.

In the development of brakeshoe mountings for rail trucks, such as streetcar trucks and similar vehicles, it has been customary to provide a shoe brake for engagement with the wheel surface, this brake being carried upon an actuating arm secured to a brake cross arm which is rotated by means of a suitable pneumatic or electrically controlled mechanism.

The present invention has for its primary object the provision of a construction in which, while the shoe is pivotally mounted for actuation, it is at the same time held so that there can be no slapping of the top edge of the shoe against the tire of the wheel when the wheel is jounced in passing over a bad rail joint.

Another feature of the present invention is the provision of means for preventing the inertia of the weight of the shoe from forcing it downwardly into possible contact with the tire of the wheel when passing over rough sections of track.

Still another feature of the present invention is the provision of means whereby the shoe may be adjusted to provide for uniform clearance about its arcuate surface with respect to the surface of the tire with which it is adapted to be engaged.

Still another feature of the present invention is the provision of a two-piece shoe in which the shoe portion itself is detachably secured to a brake head so that the shoe may be removed without disturbing the mounting of the head and its pivotal support and adjustment.

Still another feature of the present invention is the provision of means mounting the shoe for quiet cushioned relation with respect to the rocker arm so that there is no rattling or vibration transmitted from the shoe or shoe head into the truck frame.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 2 is an end elevational view of the structure shown in Figure 1;

Figure 3 is a partial top plan view of the brakeshoe assembly; and

Figure 4 is a sectional view taken through the pivot pin substantially on the line 4—4 of Figure 3.

Figure 1:
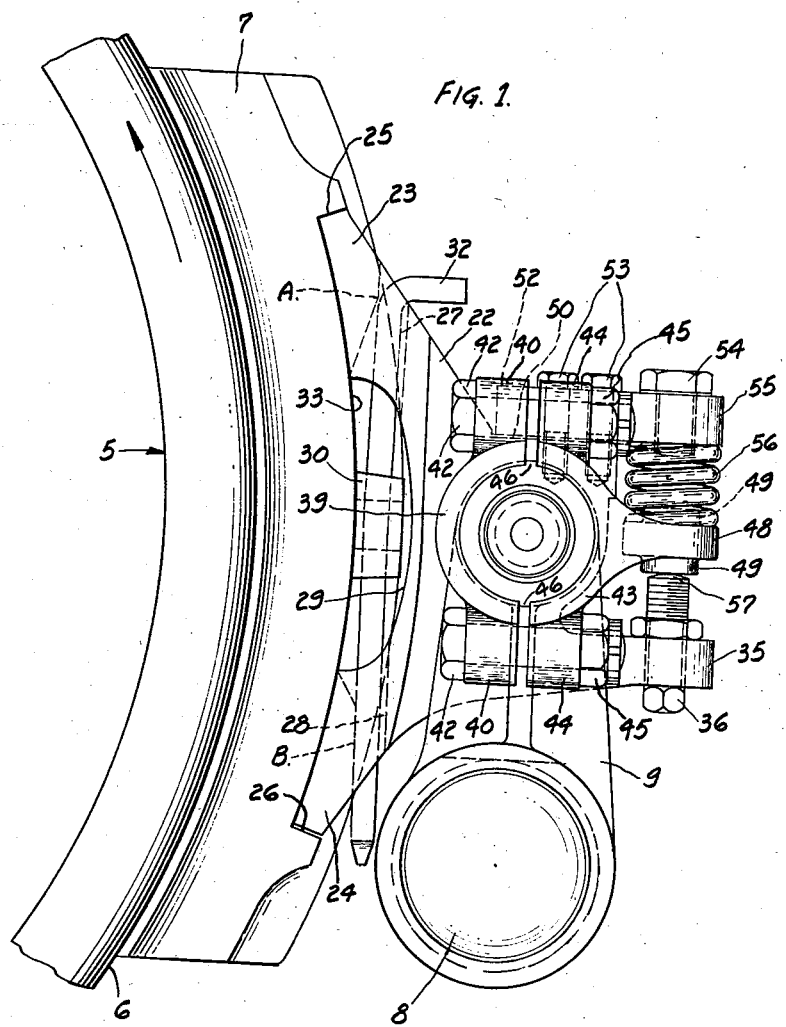
Figure 1 is a side elevational view of the brakeshoe mounting of the present invention.

Referring now in detail to the drawings, the wheel of the vehicle is indicated generally at 5 and has the wheel tire surface 6 adapted to be engaged by the arcuate brakeshoe 7, which is formed with a beveled or inclined arcuate braking surface adapted to engage the corresponding tread surface of the wheel.

Extending transversely of a vehicle truck at each end thereof is a brake cross arm or cross tube indicated generally at 8, which has mounted thereon adjacent the wheel 6 a brake actuating arm 9 which, as shown in Figure 4, has upper bifurcated extensions 10 and 12 provided with enlarged recessed boss portions 13 and 14. Extending transversely through the bosses 13 and 14 is a pivot pin 15 which is supported on these bosses by means of rubber bushings 16 and 17. The bushing 16 is retained in position against the shoulder of the boss by means of the headed end 18 of the pin, and opposite bushing 17 is retained in position by means of the washer 19 and cotter key 20.

It will thus be apparent that the pin is resiliently supported in insulated relation to the brake cross arm 9, and is capable of having relative rotational movement with respect thereto.

Pressed onto the pin is a brake head indicated generally at 22, which brake head is thereby disposed between the arms 10 and 12 of the brake arm, and is provided with an extending portion projecting toward the wheel 5 and having diverging ends 23 and 24 adapted to fit into recessed portions 25 and 26, respectively, formed in the rear face of the brakeshoe. The diverging ends 23 and 24 of the brake head 22 are provided with relatively alined vertical passageways 27 and 28, the portion of the head intermediate the ends 23 and 24 being recessed or relieved, as indicated at 29. The shoe 7 is provided with a rearwardly extending lug portion 30 suitably apertured to receive the brake key 32. This brake key is adapted to be forced downwardly through the opening 27 and through the aperture in the loop 30, and thence through the opening 28 to securely key the brakeshoe 7 to the brake head forcing the ends 23 and 24 into close fitting engagement with the recesses 25 and 26 of the head, the key having bearing engagement at the points indicated at A and B with the arm portions 23 and 24 of the head to provide a substantially resilient coupling engagement of the key with the head and the shoe. It will be noticed that the arms 23 and 24 have arcuate facing surfaces engaging the arcuate recessed portion 33 at the rear face of the brakeshoe, thereby holding the brakeshoe firmly in position against relative separation from the head and against vertical or lateral rocking movement.

The shoe 22 has the rear collar portion 34 engaging about the pin 15, and is provided with the laterally extending lug 35 formed integral therewith and suitably tapped to receive the vertically projecting adjustment stud 36 which projects between the arms 10 and 12 of the rocker arm 9.

It will be noted that the boss 13 at the upper end of the arm 10 is extended laterally to form the cylindrical sleeve portion 37 radially encircling the head 18 of the pin 15, which sleeve portion is provided adjacent its inner end with the recessed annular groove 38 for preventing axial displacement thereof.

Mounted upon the sleeve portion 37 of the boss 13 is an arcuate cap member 39 which is provided at opposite ends with lug portions 40 adapted to receive the bolts 42. A second arcuate cap member 43 is provided having suitable lug portions 44 through which the bolts 42 extend, the cap portions 39 and 43 being held together by nuts 45 threaded over the projecting ends of the bolts 42. It will be noticed that the cap members 39 and 43 have non-rotative locking engagement with ribs 46 formed on the sleeve 37 to prevent any relative rotation of this member with respect to the boss 13 or arm 9. The member 43 is provided with a rearwardly and laterally inturned lug portion 48 which is disposed in vertical alinement with the lug 35 rearwardly of the portion 34 of the brakeshoe head. The lug portion 48 is provided with opposed bosses 49, the lower one of the bosses 49 being engaged by the upper end of the adjusting stud 36 to locate the lug 35 in fixed relation to the lug 39.

The top of the brakeshoe head above its press fit upon the pin 15 is provided with a flattened recessed portion, indicated at 50 upon which is mounted the bar 52 secured in position by the two studs 53 extending downwardly through the bar into the head 22, and firmly locating the bar 52 on the head.

The rear end of the bar 52, as shown clearly in Figures 1 and 3, projects outwardly into substantial vertical alinement with the lug 35 and lug 38, and is suitably tapped to receive the stud 54 extending through the rear end 55 of the bar. The stud 54 forms a means for centering one end of a relatively heavy coil spring 56, the opposite end of which is biased about the upper boss 49 of the lug 48. It will thus be seen that there is a resilient compression member interposed between the bar 52 and the fixed lug 48.

In the operation of the mechanism thus far described, it will be apparent that the shoe 7 is rigidly coupled to the head 22. The head 22 in turn is located against counter-clockwise rotation relative the pivot 15 by means of the engagement of the upper end 57 of the adjusting stud 36 carried by the rearwardly extending lug portion 35 of the head. Thus, the head and brakeshoe are positively located in a limiting position against counterclockwise rotation about the pivot of the head 22, consequently the upper end of the shoe 7, as viewed in Figure 1, cannot slip against the wheel tread 6 upon jouncing of the wheel. Rotation of the shoe and head in a clockwise direction about the pivot of the head is resiliently opposed by the spring 56 which, in effect, provides a means for normally urging the end 57 of the stud 36 into firm contact with the boss 49 on the lug 48. As a result, the shoe and head are resiliently held by the spring 56 against any tendency to rotate or rattle relative the support on the rocker arm 9. When the wheel which rotates in the direction indicated by the arrow in Figure 1 is to be braked, the cross tube 8 is rotated in a counter-clockwise direction to rock the arm 9 toward the wheel surface. This carries the brake head and brakeshoe toward the tread surface 6 of the wheel, and forces the arcuate braking surface of the wheel against the wheel tread. This may result in a tendency for the shoe 7 to follow the wheel, and a limited movement of the shoe in this direction is provided by the spring 56 since the arm 52 bolted to the head tends to move downwardly upon such movement of the shoe, and consequently tends to compress the spring 56. However, such rocking is definitely limited by the size of the spring and the fact that it is relatively closely wound, preventing any great compression thereof. Thus the shoe is capable of accommodating the dragging tendency produced by the tread surface when braking action is to be effected, but is resiliently urged into braking engagement and adapts itself to the arcuate contour of the tread surface by reason of this limited resilient movement.

Proper clearance at all points between the brakeshoe and the tread surface of the wheel is provided by the adjusting stud 36 which is employed to produce the desired rotational movement of the shoe and head by moving the rearwardly extending lug 35 vertically relative to the lug 48, thereby providing for proper adjustment of this clearance.

It is believed readily apparent that this construction provides a novel type of brakeshoe mounting which may be readily assembled into position and which is simple insofar as the movement and design of the parts is concerned. The provision of the removable arm 52 on the head 22 allows the insertion of the spring 56 into position, thereby facilitating the assembly of the mechanism.

I am aware that a number of changes may be made in certain details of the present construction without in any way departing from the underlying principles thereof, and I therefore do not intend to be limited except as defined by the scope and spirit of the appended claims.

I claim:

1. A brake shoe assembly including a brake arm having a transverse pivot, a brake shoe head on said pivot and having a rearwardly offset lug, means non-rotatably mounted relative said pivot having a lug portion vertically spaced above said lug, an adjusting stud between said lug and lug portion, means carried on said head overlying said lug portion, and resilient means biased between said overlying means and said lug portion normally rotating said head in one direction relative to said arm, said rotation being limited by said stud.

2. A brake shoe mounting comprising a bifurcated brake arm, a brake shoe head pivotally mounted in said arm and having a rearward extension, stop means non-rotatably mounted on said arm and having an arm portion overlying said extension, a second extension on said head overlying said arm portion, resilient means between said arm portion and one of said extensions tending to rotate said head in one direction, and rotation limiting means between said arm portion and the other extension.

3. A brake shoe mounting comprising a brake shoe head having a pivot portion and an extension spaced vertically therefrom, a pivotal mounting member for said pivot portion, a second extension spaced vertically of said first extension on the opposite side of said pivot portion, stop means between one of said extensions and said pivot mounting member, and resilient means between the other extension and said pivot mounting member normally urging said stop means into engagement.

4. A brake shoe mounting comprising a brake shoe head having a pivot portion and two parallel longitudinal extensions spaced on opposite sides thereof, a brake actuating arm, a pin extending through said pivot portion and journalled in said arm, a stop member rigidly secured to said arm and having a lug portion disposed intermediate said extensions, spring means between one of said extensions and said lug portion tending to rotate said head in one direction relative to said arm, and stop means between the other extension and said lug portion limiting the action of said spring means.

5. A brake shoe mounting comprising a brake actuating arm having a bifurcated end provided with transversely spaced pivot journal portions, a brake shoe head having a pivot pin, resilient cushioning means journalling said pin in said journal portions, one of said portions having a lateral extension, split clamp means non-rotatably secured on said extension and having an extension disposed in alinement with said head, and means reacting between said extension and said head preventing rotation of said head in one direction relative to said arm.

6. A brake shoe mounting for a tread braked car wheel comprising a brake actuating arm having a bifurcated end provided with transversely spaced pivot journal portions, a brake shoe head having a pivot pin, resilient cushioning means journalling said pin in said journal portions, one of said portions having a lateral extension, split clamp means non-rotatable secured on said extension and having an extension projecting into spaced relation with said head, and means reacting between said extension and said head preventing rotation of said head in one direction relative to said arm but providing limited rotation thereof in the opposite direction.

7. In combination, a brake arm having a bifurcated end, a brake shoe head journalled in said end and having vertically spaced parallel rearward extensions, a bracket non-rotatably secured on said arm and having an arm portion disposed between said extensions, resilient means between said arm portion and one extension tending to rotate said head in one direction, and adjustable stop means between the other extension and said arm portion limiting rotation in said direction.

8. In combination, a brake arm having a bifurcated end, a brake shoe head journalled in said end and having vertically spaced parallel rearward extensions, a bracket non-rotatably secured on said arm and having an arm portion disposed between said extensions, resilient means between said arm portion and one extension tending to rotate said head in one direction, and adjustable stop means between the other extension and said arm portion limiting rotation in said direction, said stop means being inoperative to prevent rotation of said head in the opposite direction.

9. The combination, with a rail car truck having a rail car wheel, a brake shoe normally disposed concentric with said wheel and spaced slightly from the tread thereof, and a transverse brake cross shaft of a brake actuating arm on said shaft, a brake shoe head journalled on one end of said arm and supporting said shoe, means between said head and arm preventing rotation of said head in a direction to produce movement of the top of said shoe toward said wheel tread upon jouncing of said truck, and resilient means biased between said arm and head normally tending to rotate said head in the opposite direction.

10. In combination, a brake actuating arm, a brake shoe head pivotally mounted on said arm, a bracket non-rotatably secured to said arm and having an offset portion disposed rearwardly of said head, said head having rigid parallel rearward extensions spaced on opposite sides of said offset portion, means carried by one of said extensions forming a predetermined stop between said offset portion and said head limiting rotation of said head in one direction, and means biased between said offset portion and the other extension of said head normally urging said head against said stop means.

ALFRED O. WILLIAMS.